United States Patent [19]

Brown

[11] Patent Number: 4,638,969
[45] Date of Patent: Jan. 27, 1987

[54] VIDEO DISPLAY ARRANGEMENT

[75] Inventor: Walter J. Brown, Spartanburg, S.C.

[73] Assignee: Milliken Research Corporation, Spartanburg, S.C.

[21] Appl. No.: 686,138

[22] Filed: Dec. 24, 1984

[51] Int. Cl.⁴ .............................................. F16L 3/00
[52] U.S. Cl. .................... 248/122; 248/284; 248/298; 248/299
[58] Field of Search ........... 248/122, 121, 124, 123.1, 248/125, 298, 299, 291, 284, 283, 139, 158, 646, 639, 676, 649, 128, 149, 1 B, 1 E, 1 F; 400/714; 108/5, 6; 312/208

[56] References Cited

U.S. PATENT DOCUMENTS

| | | | |
|---|---|---|---|
| 2,577,934 | 12/1951 | Tubacki | 312/208 X |
| 2,765,796 | 10/1956 | Guenther | 248/124 X |
| 3,591,115 | 7/1971 | Hibbard | 248/122 |
| 3,711,175 | 1/1973 | Sottsass, Jr. | 312/208 |
| 4,310,136 | 1/1982 | Mooney | 248/1 F |
| 4,365,561 | 12/1982 | Teller et al. | 248/1 E |
| 4,546,947 | 10/1985 | Gesten | 248/1 B |

FOREIGN PATENT DOCUMENTS 96373 6/1983 European Pat. Off. ............ 248/183

Primary Examiner—J. Franklin Foss
Assistant Examiner—David L. Talbott
Attorney, Agent, or Firm—Earle R. Marden; H. William Petry

[57] ABSTRACT

A display arrangement for a video screen and a key board operably associated therewith in which the video is capable of vertical and horizontal rotary adjustment in conjunction with vertical and horizontal rotary motion of the key board. A shield is provided for the video screen to protect it from corrosive elements in the surrounding atmosphere.

11 Claims, 3 Drawing Figures

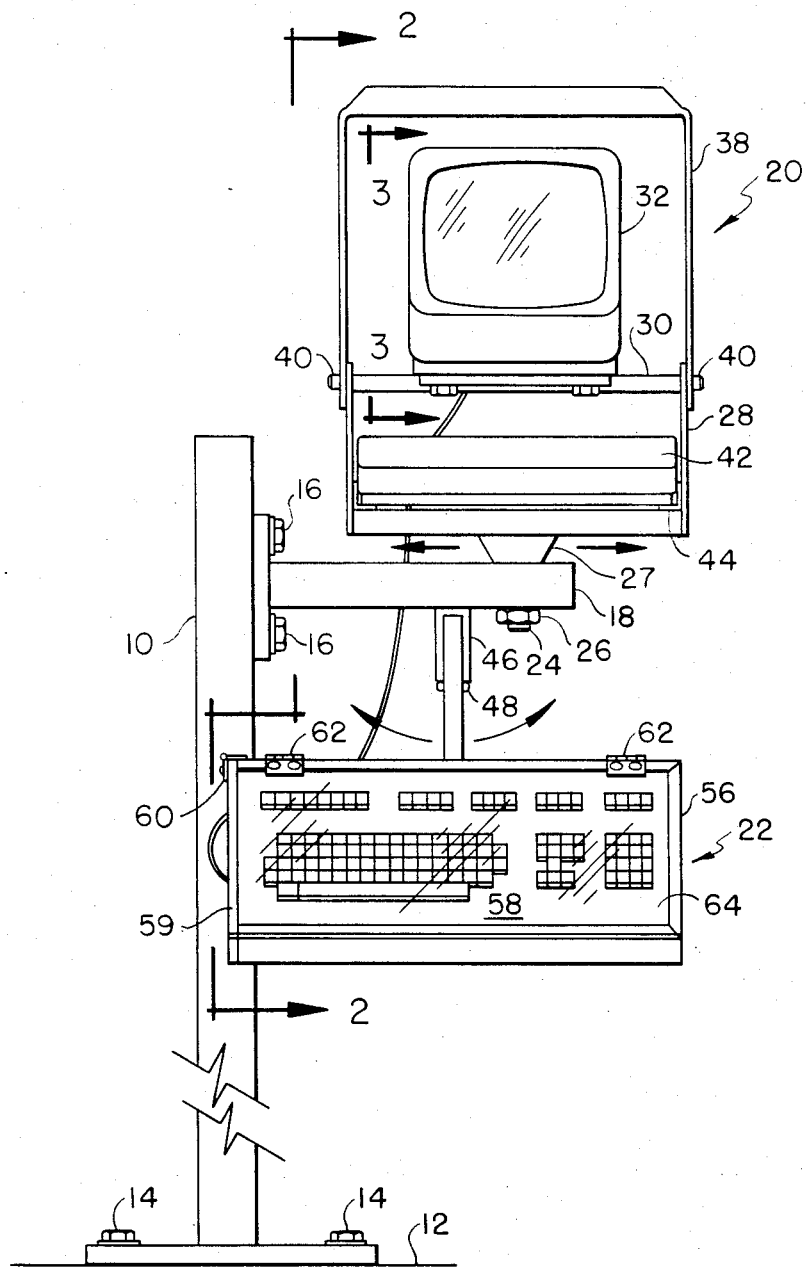
FIG.-1-

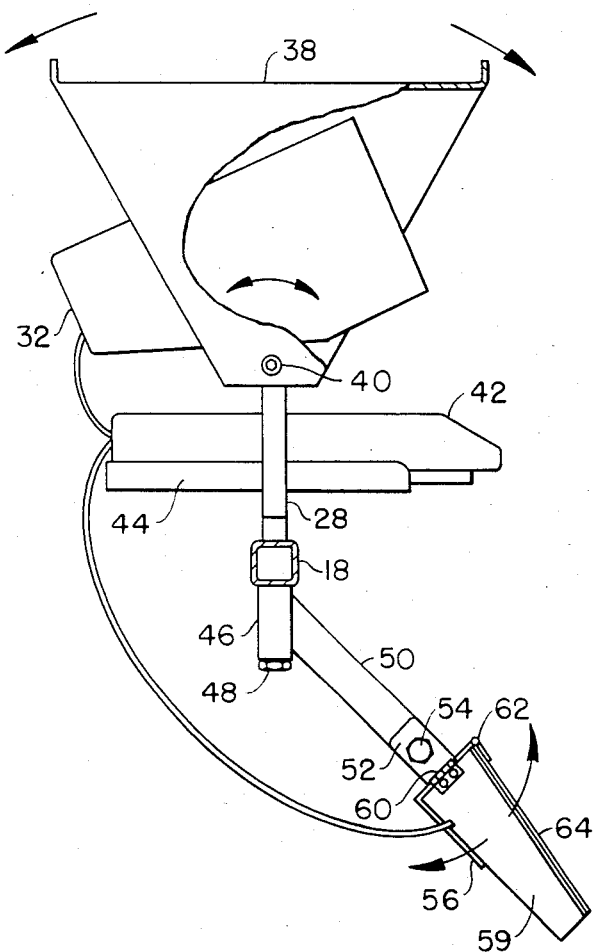
FIG.-2-
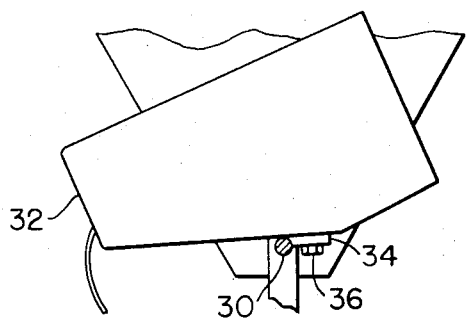
FIG.-3-

VIDEO DISPLAY ARRANGEMENT

This invention relates to a display arrangement for mounting videos and key boards in a manufacturing environment which can be made readily accessible to an operation in the manufacturing area.

It is therefore an object of this invention to provide a video and key board support structure suitable for use in a manufacturing area which can readily be adjusted for use by various personnel desiring to use same.

Other objects of the invention will become readily apparent as the specification proceeds to describe the invention with reference to the accompanying drawings, in which:

FIG. 1 is a front view of the new and novel video and key board arrangement;

FIG. 2 is a side view taken on line 2—2 of FIG. 1 and

FIG. 3 is a cross-section view taken on line 3—3 of FIG. 1 showing the video mounting arrangement.

Looking now to FIGS. 1 and 2, the new and novel support structure is shown supported in a vertical position by a support member 10 bolted to the floor 12 by suitable screws or bolts 14. Extending outwardly from the support member 10 and bolted thereto by suitable bolts 16 is the video-key board support member 18. The support member 18 supports the video arrangement 20 above where it can be viewed by the operator and the key board 22 arrangement below where it can be manipulated by the operator.

The video arrangement 20 is basically supported by a threaded stud 24 which projects through an opening in the support member 18 and, when rotated to the desired position, is secured by a nut 26 screwed onto the stud 24 until it bears against the support member 18. Connected to the stud 24 is a truncated element 27 to which the U-shaped support 28 is welded or otherwise secured. Supported in and at the upper reaches of the U-shaped support 28 is a bar 30 which supports the video screen 32.

Looking at FIG. 3, it can be seen that a plate 34 is welded to the bar 30 and a plurality of screws 36 project therethrough into the bottom of the video screen housing to secure same to the bar 30. To secure the video screen 32 in its adjusted vertical position and the aluminum protective housing 38, the ends of the rod 30 are tapped and screws 40 secured therein. To adjust the position of the video screen 32 and/or the housing 38, the operator can loosen the screws 40, rotate the desired member and re-tighten the screws 40.

If it is desired to use a computer systems box 42 in conjunction with the video 20 and the key board 22, a tray 44 can be welded to the inside of the U-shaped bracket 28 below the video screen 32 to support the systems box 42.

Connected to the bottom of the support member 18 is a threaded stud, not shown, over which is telescoped a rotatable collar 46 held in place by a nut 48 threaded to the threaded stud. Welded or otherwise secured to the collar 46 at an angle thereto is a support member 50 connected to the bracket 52 by a bolt and nut arrangement 54 to allow up and down adjustment of the case 56 for the key board 58. One end 59 of the case 56 is pivotally mounted at 60 to allow ingress and egress of the key board 58. Pivotally mounted at 62 to the case 56 is a clear plastic-like sheet 64 to allow access to the key board when open and provides protection therefor when closed.

It is obvious that the herein disclosed support structure provides a mounting arrangement for a video-key board set-up that not only protects the equipment in a corrosive manufacturing environment but allows adjustment of same for early individual operation to increase the overall efficiency of the operation. Each operator can readily adjust the equipment for their own size and work habits without effecting the efficiency of the proceeding or following operation of the same equipment.

Although the preferred enbodiment of the invention has been described in detail, it is contemplated that many changes may be made without departing from the scope or spirit of the invention and it is desired that the invention be limited only by the claims.

I claim:

1. A support arrangement for mounting a video screen and a key board in a manufacturing environment comprising: a vertical support member, a second support member mounted to and substantially perpendicular to said vertical support member, a first casing horizontally, adjustably supported above and by said second support member, a rotatably adjusted bar member support in said first casing, a video screen attached to said bar member, means mounting a key board casing horizontally and adjustably below and to said second support member, said means including a second means to allow vertical rotation of said key board casing and a key board slidably mounted in said casing.

2. The arrangement of claim 1 wherein a tray is mounted in said first casing and a systems box is mounted on said tray.

3. The arrangement of claim 1 wherein said first casing includes a U-shaped bracket member mounted to said second support member and a housing over said video screen.

4. The arrangement of claim 3 wherein said bar member is mounted in said U-shaped bracket member and is tapped in both ends thereof and said housing is secured by screws therethrough and screwed into said tapped ends of said bar member.

5. The arrangement of claim 1 wherein said key board casing has one end thereof pivotally mounted to allow said key board to be slid into and out of said casing.

6. The arrangement of claim 5 wherein said key board has a plurality of buttons on one side thereof, said key board casing having the side thereof next adjacent thereof of plastic-like material and said casing side of plastic-like material being pivotally mounted to said key board to allow access to the bottom of key board.

7. The arrangement of claim 6 wherein a tray is mounted in said first casing and a systems box is mounted on said tray.

8. The arrangement of claim 7 wherein said first casing includes a U-shaped bracket member mounted to said second support member and a housing over said video screen.

9. The arrangement of claim 8 wherein said bar member is mounted in said U-shaped bracket member and is tapped in both ends thereof and said housing is secured by screws therethrough and screwed into said tapped ends of said bar member.

10. The arrangement of claim 6 wherein said first casing includes a U-shaped bracket member mounted to said second support member and a housing over said video screen.

11. The arrangement of claim 10 wherein said bar member is mounted in said U-shaped bracket member and is tapped in both ends thereof and said housing is secured by screws therethrough and screwed into said tapped ends of said bar member.

* * * * *